(12) United States Patent
Bauer et al.

(10) Patent No.: US 12,077,097 B2
(45) Date of Patent: Sep. 3, 2024

(54) ROOF RACK

(71) Applicant: Dr. Ing. h.c. F. Porsche Aktiengesellschaft, Stuttgart (DE)

(72) Inventors: Markus Alexander Bauer, Dissen a.T.W. (DE); Gilsung Park, Pforzheim (DE); Johannes Herde, Ditzingen (DE); Markus Schmidt, Jettingen (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 115 days.

(21) Appl. No.: 17/903,256

(22) Filed: Sep. 6, 2022

(65) Prior Publication Data

US 2023/0084444 A1    Mar. 16, 2023

(30) Foreign Application Priority Data

Sep. 10, 2021  (DE) .................. 10 2021 123 511.1

(51) Int. Cl.
  B60Q 1/26       (2006.01)
  B60R 9/04       (2006.01)

(52) U.S. Cl.
  CPC ......... B60Q 1/2661 (2013.01); B60Q 1/2696 (2013.01); B60R 9/04 (2013.01)

(58) Field of Classification Search
  CPC ........ B60Q 1/2661; B60Q 1/2696; B60R 9/04
  See application file for complete search history.

(56) References Cited

U.S. PATENT DOCUMENTS

| 5,171,083 | A  | * | 12/1992 | Rich ................... | B60Q 1/2611 |
| | | | | | 362/418 |
| 6,114,954 | A  | * | 9/2000  | Palett ................. | B60Q 1/0035 |
| | | | | | 340/478 |
| 7,377,674 | B2 | * | 5/2008  | Klinkman ............. | B60Q 1/302 |
| | | | | | 382/294 |
| 9,758,088 | B1 | * | 9/2017  | Salter .................. | B60Q 1/0035 |
| 2005/0092796 | A1 | * | 5/2005 | Essig ................... | B60R 9/00 |
| | | | | | 224/321 |
| 2007/0090139 | A1 | * | 4/2007 | McKenzie ........... | B60R 9/0485 |
| | | | | | 224/310 |
| 2008/0122236 | A1 | * | 5/2008 | Peterson ............. | B60Q 1/2611 |
| | | | | | 296/3 |
| 2012/0031939 | A1 | * | 2/2012 | Jutila .................. | B60Q 1/2611 |
| | | | | | 224/326 |
| 2015/0138803 | A1 | * | 5/2015 | Salter .................. | B60Q 1/2661 |
| | | | | | 362/510 |
| 2016/0052445 | A1 | * | 2/2016 | Huang ................ | B60Q 1/44 |
| | | | | | 362/520 |
| 2016/0121799 | A1 | * | 5/2016 | McClintock ........ | B60Q 1/2661 |
| | | | | | 224/309 |
| 2021/0146824 | A1 | * | 5/2021 | Egbert, II ........... | B60R 9/10 |

FOREIGN PATENT DOCUMENTS

| CA | 3008293 A1 | 12/2018 |
| CN | 108657080 A | 10/2018 |
| CN | 211493870 U | 9/2020 |

* cited by examiner

*Primary Examiner* — Bryon T Gyllstrom
(74) *Attorney, Agent, or Firm* — Buchanan Ingersoll & Rooney PC

(57) ABSTRACT

A roof rack has at least one lighting device, which is arranged in a protected manner on a rack part. In order to improve the roof rack functionally and/or in respect of its appearance, the rack part includes a fairing having at least two light passage openings, which are assigned to the lighting device.

11 Claims, 2 Drawing Sheets

ROOF RACK

CROSS-REFERENCE TO RELATED APPLICATION

This application claims priority to German Patent Application No. 10 2021 123 511.1, filed Sep. 10, 2021, the content of such application being incorporated by reference herein in its entirety.

FIELD OF THE INVENTION

The invention relates to a roof rack having at least one lighting device, which is arranged in a protected manner on a rack part.

BACKGROUND OF THE INVENTION

U.S. Pat. No. 7,377,674 B2, which is incorporated by reference herein, and Chinese Patent Application CN 108657080 A, which is incorporated by reference herein, disclose roof racks which are embodied as roof baskets and have inserted lighting units which are protected against environmental influences, such as water and dust. US 2016/0052445 A1, which is incorporated by reference herein, discloses a roof basket having an integrated lighting unit, wherein a receptacle for a warning light is integrated into a mounting frame. Chinese Utility Model CN 211493870 U, which is incorporated by reference herein, discloses an extendable roof basket which has lighting units that are protected by a cover.

SUMMARY OF THE INVENTION

Described herein is a roof rack having at least one lighting device, which is arranged in a protected manner on a rack part, functionally and/or in respect of its appearance.

The roof rack has at least one lighting device, which is arranged in a protected manner on a rack part, by virtue of the fact that the rack part comprises a fairing having at least two light passage openings, which are assigned to the lighting device. The roof rack is preferably a roof basket having a front crossmember and a rear crossmember. The two crossmembers are connected to one another by longitudinal members. The two longitudinal members and the crossmembers form a frame for the roof basket. Further crossmembers and/or longitudinal members constitute a base for the roof basket within the frame. By means of the fairing on the rack part, the lighting device integrated into the roof rack is protected against environmental influences, such as dust and/or spray. By virtue of the separate embodiment of the fairing, the fastening of the lighting device on the rack part is considerably simplified. By means of the at least two light passage openings in the fairing for the lighting device, visually appealing integration of the lighting device into the roof rack, in particular the roof basket, is made possible in a simple manner.

A preferred exemplary embodiment of the roof rack wherein the light passage openings each have an elongate shape with a horizontal longitudinal extent in a transverse direction of the vehicle. The transverse direction of the vehicle is also referred to as the y-direction. By virtue of the elongate shape of the mutually separate light passage openings, the virtual representation of two light sources on the roof rack is made possible with just one lighting device.

Another preferred exemplary embodiment of the roof rack wherein the two light passage openings assigned to the lighting device are arranged next to one another in the manner of spectacles. In this way, the visual appearance of a motor vehicle equipped with the roof rack can be significantly enhanced by simple means.

Another preferred exemplary embodiment of the roof rack wherein the two light passage openings assigned to the lighting device are closed by one or in each case one transparent additional cover. With the additional cover, the light passage openings can be leaktightly closed. Depending on the desired optics, an additional cover can be assigned to each light passage opening. However, it is also possible to close both light passage openings with a single additional cover. The additional cover is advantageously clipped into the respective light passage opening.

Another preferred exemplary embodiment of the roof rack wherein the lighting device comprises an LED strip. The LED strip is preferably arranged behind the light passage openings in a longitudinal direction of the vehicle. In this case, the light passage openings are advantageously configured in such a way that the LED strip arranged behind them is not, or not readily, visible or recognizable from the outside.

Another preferred exemplary embodiment of the roof rack wherein the lighting device rests, with the interposition of a seal, against a circumferential collar which in each case delimits one of the light passage openings and is connected integrally to the fairing. The seal is a simple means of preventing dirt or water from penetrating between the fairing and the lighting device. Thus, it is advantageously possible to dispense with the above-described additional cover.

Another preferred exemplary embodiment of the roof rack wherein the lighting device is secured on two ribs which project from the rack part. The ribs on the rack part can advantageously be formed on the rack part in an injection molding process. The rack part and advantageously also the fairing are advantageously formed from a plastics material. The lighting device is advantageously secured detachably, for example by means of suitable fastening means, such as screws, on the ribs of the rack part.

Another preferred exemplary embodiment of the roof rack wherein the rack part is combined with a front roof basket profile. The front roof basket profile is preferably formed from a metal, for example from an aluminum material. The rack part and the fairing are advantageously produced from a plastics material, in particular by injection molding. The rack part and the fairing are advantageously combined with the front roof rack profile in such a way that a crossmember, in particular a front crossmember, is created on which only the total of four light passage openings, which are arranged in pairs in the manner of spectacles, are visible on the outside.

Another preferred exemplary embodiment of the roof rack wherein two lighting devices are secured on the rack part, to each of which two light passage openings are assigned. The two lighting devices are advantageously arranged symmetrically in the transverse direction of the vehicle. Each lighting device is assigned two light passage openings, behind which an LED strip is arranged.

The invention furthermore relates to a fairing, a rack part, a lighting device, a roof basket profile and/or an additional cover for a roof rack described above. The parts mentioned can be handled separately. The invention may also relate to a vehicle with a roof rack designed as a roof basket, as described above.

BRIEF DESCRIPTION OF THE DRAWINGS

Further advantages, features and details of the invention will be found in the following description, in which various exemplary embodiments are described in detail with reference to the drawing. In the drawing.

DETAILED DESCRIPTION OF THE INVENTION

Figure 1:
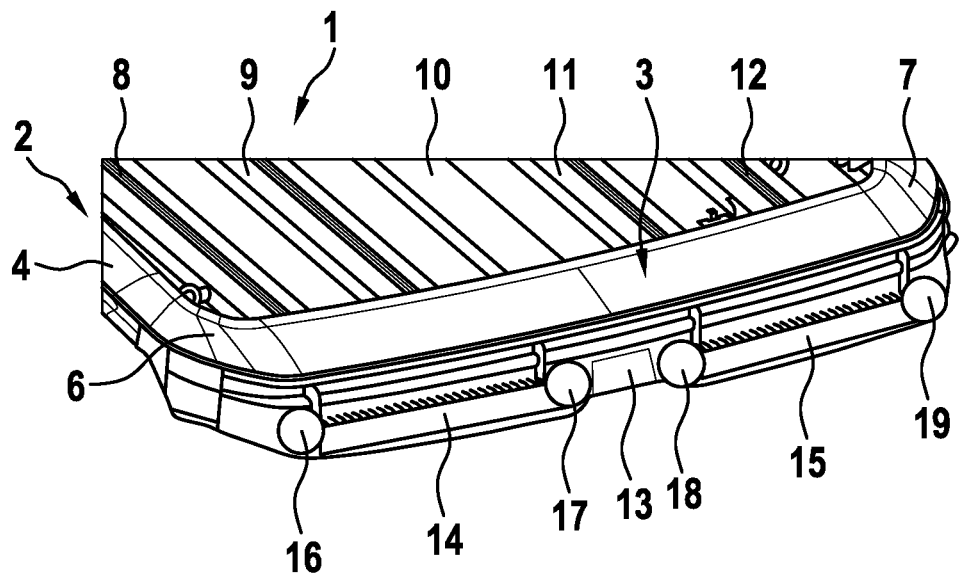
FIG. 1 shows a perspective illustration of a roof rack, having two lighting devices, which are integrated into a front crossmember of the roof rack.

FIG. 1 illustrates in perspective a roof rack 1 designed as a roof basket 2 having a front crossmember 3. In addition to the front cross member 3, the roof basket 2 comprises a rear crossmember which, together with two longitudinal members 4, forms a frame of the roof basket 2. The longitudinal members 4 are connected to the front crossmember 3 by corner elements 6, 7. Within the frame formed by the front crossmember 3, the rear crossmember and the two longitudinal members 4, the roof basket 2 comprises further members 8, 9, 10, 11, 12, which are designed as longitudinal members. As a departure from the illustration, however, members 8 to 12 can also be embodied as crossmembers within the frame.

The front crossmember 3 comprises a rack part 13, on which two lighting devices 14, 15 are secured. The lighting devices 14, 15 are embodied as LED strips. The capital letters LED stand for the English terms Light Emitting Diode.

Each lighting device 14, 15 is detachably secured on the rack part 13 at two fastening points 16, 17; 18, 19. Fastening means, such as screws, are advantageously used for detachable connection.

Figure 2:
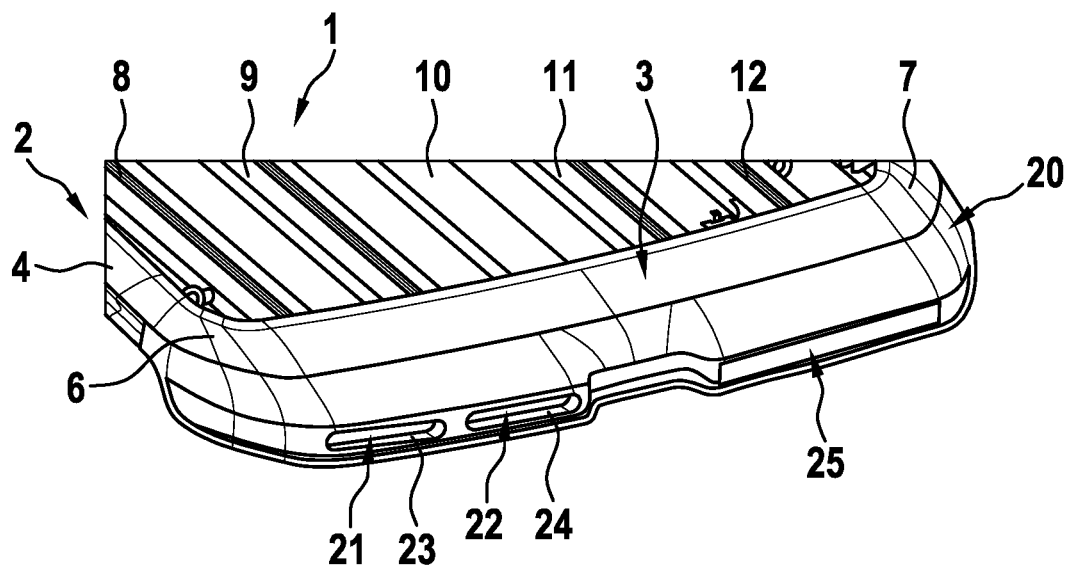
FIG. 2 shows the roof rack from FIG. 1 with a fairing for the two lighting devices.

It can be seen in FIG. 2 that the front crossmember 3 is additionally combined with a fairing 20. The fairing 20 serves, in particular, to protect the lighting devices 14, 15 secured on the rack part 13 from environmental influences, such as dust or spray. The fairing 20 comprises two light passage openings 21, 22 for each of the two lighting devices 14, 15.

The light passage openings 21, 22, which are assigned to the lighting device 14 on the left in FIGS. 1 and 2, each have an elongate shape, as do the light passage openings, not visible in FIG. 2, which are assigned to the lighting device 15 on the right in FIGS. 1 and 2. The light passage openings 21, 22 substantially have the shape of oblong holes, each of which is bordered by a collar 23, 24.

The light passage openings assigned to the lighting device 15 arranged on the right in FIGS. 1 and 2 are, as can be seen in FIG. 2, closed by a common additional cover 25. The additional cover 25 is formed from a transparent plastic material or glass material.

Figure 3:
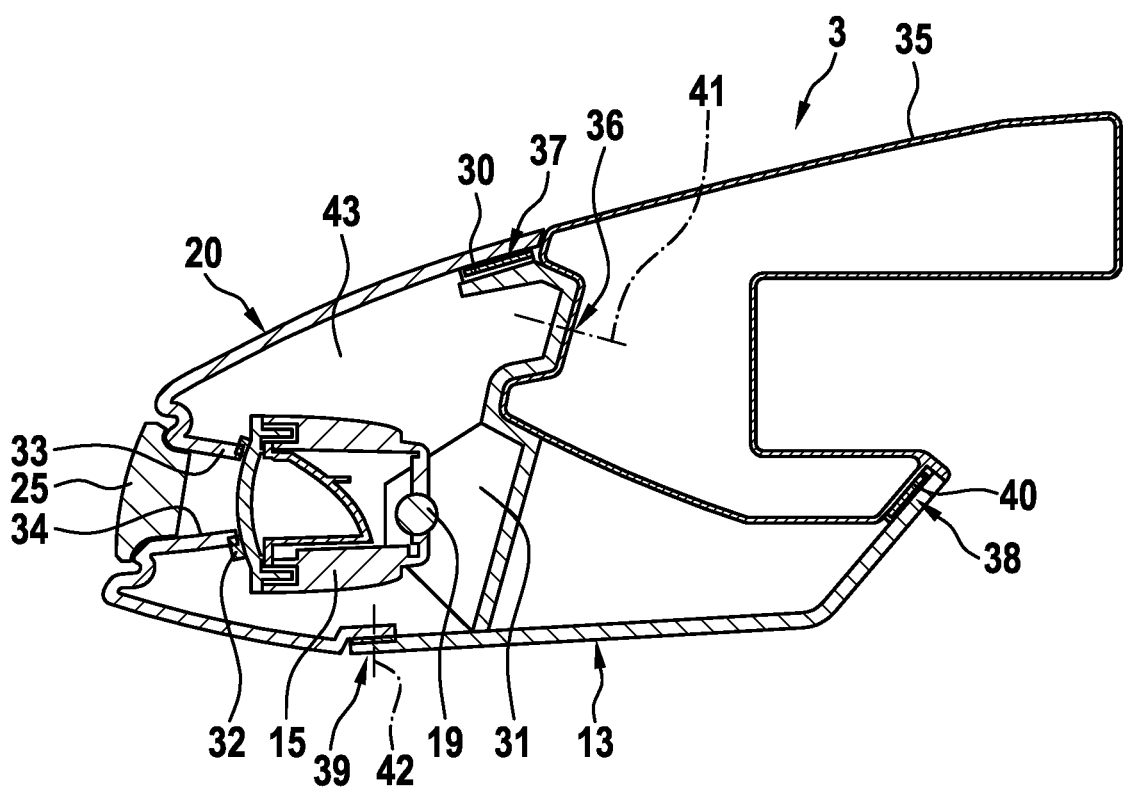
FIG. 3 shows the front crossmember from FIG. 2 in a cross section.

It can be seen in FIG. 3 that the front crossmember 3 comprises a front roof basket profile 35, on which the rack part 13 is secured, as seen in cross section, at three fastening points 36, 37, 38. At fastening point 36, the rack part 13 is secured on the front roof basket profile 35 with the aid of a screw connection 41, which is shown only indicatively.

In FIG. 3, the fairing 20 is secured on the top of the rack part 13 with the aid of a double-sided adhesive tape, which serves to form a seal 30. By means of the adhesive bonding to the double-sided adhesive tape, a visually attractive flush transition to the front roof basket profile 35 is created.

At fastening point 38, an end of the rack part 13 which is at the rear in FIG. 3 is secured on the front roof basket profile 35. The double-sided adhesive tape likewise advantageously serves to form a seal 40 at fastening point 38.

At a lower end of the rack part 13, which is at the front in FIG. 3, the fairing 20 is secured at a fastening point 39. Fastening point 39 comprises a seal (not designated specifically) and a screw connection 42 (shown only indicatively).

FIG. 3 further shows that lighting device 15 is secured on one rib 31 of a total of two ribs for the lighting device 15. The lighting device 15 is advantageously secured on the rib 31 at fastening point 19 by means of a screw connection.

A collar 33, which delimits a light passage opening 34, is connected leaktightly to a light exit surface of the lighting device 15, which surface is at the front in FIG. 3, with the interposition of a seal 32. This is a simple way of preventing dirt or water passing through the light passage opening 34 into a receiving space 43 for the lighting device 15.

The receiving space 43 for the lighting device 15 is delimited by the rack part 13 and the fairing 20. In this case, the fairing 20 completely encloses lighting device 15 and also lighting device 14, which is not visible in FIG. 3.

What is claimed is:

1. A roof rack for a vehicle comprising:
   a rack part including a fairing having a hollow body defining an at least partially enclosed interior region, wherein at least two light passage openings are disposed on the body and open into the at least partially enclosed interior region; and
   at least one stationary lighting device at least partially arranged within the at least partially enclosed interior region of the fairing to protect the at least one stationary lighting device from the environment,
   wherein the at least one stationary lighting device is assigned to at least one of the two light passage openings.

2. The roof rack as claimed in claim 1, wherein the light passage openings each have an elongate shape with a horizontal longitudinal extent in a transverse direction of the vehicle.

3. The roof rack as claimed in claim 1, wherein the two light passage openings assigned to the lighting device are arranged next to one another in the manner of spectacles.

4. The roof rack as claimed in claim 1, wherein the two light passage openings assigned to the lighting device are closed by one or in each case one transparent additional cover.

5. The roof rack as claimed in claim 1, wherein the lighting device comprises an LED strip.

6. The roof rack as claimed in claim 1, wherein the lighting device is secured on two ribs which project from the rack part.

7. The roof rack as claimed in claim 1, wherein the rack part is combined with a front roof basket profile.

8. The roof rack as claimed in claim 1, wherein two of the lighting devices are secured on the rack part, to each of which two light passage openings are assigned.

9. An assembly comprising the roof rack of claim 1, a roof basket profile and/or an additional cover for the roof rack.

10. A vehicle comprising the roof rack of claim 1.

11. A roof rack for a vehicle comprising:
    a rack part including a fairing having at least two light passage openings; and
    at least one lighting device arranged on the rack part, wherein the at least one lighting device is assigned to the at least two light passage openings, wherein the lighting device rests, with the interposition of a seal, against a circumferential collar which delimits one of the light passage openings and is connected integrally to the fairing.

* * * * *